United States Patent
Katagiri et al.

(10) Patent No.: US 11,668,579 B2
(45) Date of Patent: Jun. 6, 2023

(54) MOVING ROUTE GUIDANCE DEVICE, MOVING BODY, AND MOVING ROUTE GUIDANCE METHOD

(71) Applicant: RICOH COMPANY, LTD., Tokyo (JP)

(72) Inventors: Keita Katagiri, Kanagawa (JP); Kenichiroh Saisho, Tokyo (JP); Masato Kusanagi, Kanagawa (JP); Hiroshi Yamaguchi, London (GB); Yuuki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 441 days.

(21) Appl. No.: 16/963,114

(22) PCT Filed: Mar. 25, 2019

(86) PCT No.: PCT/JP2019/012343
§ 371 (c)(1),
(2) Date: Jul. 17, 2020

(87) PCT Pub. No.: WO2019/188891
PCT Pub. Date: Oct. 3, 2019

(65) Prior Publication Data
US 2021/0123760 A1 Apr. 29, 2021

(30) Foreign Application Priority Data

Mar. 29, 2018 (JP) .............................. JP2018-064559

(51) Int. Cl.
*G01C 21/36* (2006.01)
*B60R 1/00* (2022.01)

(52) U.S. Cl.
CPC .............. *G01C 21/365* (2013.01); *B60R 1/00* (2013.01); *G01C 21/3658* (2013.01);
(Continued)

(58) Field of Classification Search
CPC .... G01C 21/365; G01C 21/3658; B60R 1/00; B60R 2300/10; B60R 2300/20; B60R 2300/8033; B60R 2300/804
See application file for complete search history.

(56) References Cited

U.S. PATENT DOCUMENTS

| 2013/0063754 A1 | 3/2013 | Saisho et al. |
| 2013/0253830 A1 | 9/2013 | Breisinger et al. |

(Continued)

FOREIGN PATENT DOCUMENTS

| EP | 3 184 365 A3 | 6/2017 |
| JP | 2007-121031 | 5/2007 |

(Continued)

OTHER PUBLICATIONS

International Search Report and Written Opinon dated Jun. 28, 2019 in PCT/JP2019/012343 filed on Mar. 25, 2019.

*Primary Examiner* — Terrell M Robinson
(74) *Attorney, Agent, or Firm* — Xsensus LLP

(57) ABSTRACT

The moving route guidance device includes: display control means configured to execute display control to change at least one of a content and a display position of the route guidance image based on position information of the moving body. The route guidance image includes: a plurality of route identification images respectively corresponding to the plurality of the movable routes that are close to each other and displayed in a manner to correspond to a visually recognized position relationship between the plurality of the movable routes by the driver or a predetermined reference position; and an route instructing image displayed in association with the route identification image that corresponds to the moving route guided by the route guidance image of the plurality of the movable routes.

9 Claims, 20 Drawing Sheets

(52) U.S. Cl.
CPC ....... *B60R 2300/10* (2013.01); *B60R 2300/20* (2013.01); *B60R 2300/804* (2013.01); *B60R 2300/8033* (2013.01)

(56) References Cited

U.S. PATENT DOCUMENTS

| | | | |
|---|---|---|---|
| 2014/0177022 A1 | 6/2014 | Saisho et al. | |
| 2015/0062345 A1 | 3/2015 | Kusanagi | |
| 2015/0277115 A1 | 10/2015 | Inamoto et al. | |
| 2015/0331487 A1* | 11/2015 | Roth | B60Q 9/008 345/156 |
| 2015/0370069 A1 | 12/2015 | Saisho et al. | |
| 2016/0313562 A1 | 10/2016 | Saisho et al. | |
| 2016/0327402 A1* | 11/2016 | Funabiki | G08G 1/09623 |
| 2016/0334637 A1 | 11/2016 | Saisho et al. | |
| 2016/0349066 A1 | 12/2016 | Chung et al. | |
| 2017/0155867 A1 | 6/2017 | Yokota et al. | |
| 2017/0187963 A1* | 6/2017 | Lee | G06V 20/56 |
| 2017/0235140 A1 | 8/2017 | Kusanagi | |
| 2017/0315353 A1 | 11/2017 | Saisho et al. | |
| 2017/0336222 A1 | 11/2017 | Yamaguchi et al. | |
| 2017/0336629 A1 | 11/2017 | Suzuki et al. | |
| 2018/0024360 A1 | 1/2018 | Inamoto et al. | |
| 2018/0180879 A1 | 6/2018 | Yamaguchi et al. | |
| 2018/0180880 A1 | 6/2018 | Katagiri et al. | |
| 2018/0218711 A1 | 8/2018 | Suzuki et al. | |
| 2018/0218713 A1 | 8/2018 | Kusanagi et al. | |
| 2018/0267306 A1 | 9/2018 | Nakamura et al. | |
| 2018/0307056 A1 | 10/2018 | Saisho et al. | |
| 2018/0319281 A1* | 11/2018 | Nishizaki | G02B 26/105 |
| 2019/0191131 A1* | 6/2019 | Uchida | G02B 27/0977 |
| 2021/0341304 A1* | 11/2021 | Kunii | B60Q 1/525 |

FOREIGN PATENT DOCUMENTS

| | | |
|---|---|---|
| JP | 4497316 B2 * | 7/2010 |
| JP | 2016-024004 | 2/2016 |
| JP | 2018-105838 | 7/2018 |

* cited by examiner

MOVING ROUTE GUIDANCE DEVICE, MOVING BODY, AND MOVING ROUTE GUIDANCE METHOD

TECHNICAL FIELD

Embodiments of the present disclosure relates to a moving route guidance device, a moving body, and a moving route guidance method.

BACKGROUND ART

As an example of a moving route guidance device, a moving route guidance device that displays a route guidance image for guiding a driver of a moving body to a moving route in a predetermined display area at front in a moving body advancing direction, using an image projection unit has been known.

For example, a head-up display apparatus (a HUD apparatus) is disclosed in PTL 1. The HUD apparatus projects image light onto a front windshield (a light transmitting member) of an automobile (the moving body), and overlaps the image light with front scenery that is visually recognized by the driver via the front windshield, so as to display the route guidance image for the driver. For example, in the case where two left turning routes that are close to each other exist of at (a front side and a back side) an intersection ahead of the automobile and the automobile is guided to the left turning route on the back side of the two routes, for a purpose of preventing the driver from being confused with the left turning route on a front side, the HUD apparatus displays the route guidance image like an arrow along a connecting line that connects a reference location of the intersection (near a center of the intersection) and an entrance position of the left turning route on the back side.

CITATION LIST

Patent Literature

PTL 1: Japanese Unexamined Patent Application Publication No. 2016-24004

SUMMARY OF INVENTION

Technical Problem

However, in the case where the route guidance image is displayed in a manner to overlap the front scenery in the moving body advancing direction so as to guide the driver of the moving body to the moving route and where a plurality of movable routes close to each other exist, with typical apparatuses including the HUD apparatus disclosed in PTL 1, it is difficult for the driver to accurately recognize which one of the movable routes is the moving route guided by the displayed route guidance image.

Solution to Problem

In order to solve the above-mentioned problem, an embodiment of the present disclosure includes a moving route guidance device including: display control means configured to execute display control to change at least one of a content and a display position of the route guidance image based on position information of the moving body. The route guidance image includes: a plurality of route identification images respectively corresponding to a plurality of movable routes that are close to each other and displayed in a manner to correspond to a visually recognized position relationship among the plurality of the movable routes by the driver or a predetermined reference position; and route instructing images displayed in association with the route identification images that correspond to a moving route guided by the route guidance image of the plurality of the movable routes.

Advantageous Effects of Invention

According to the embodiments of the present disclosure, the driver can accurately recognize which of the plurality of the movable routes, which are close to each other, is the moving route guided by the route guidance image.

BRIEF DESCRIPTION OF DRAWINGS

The accompanying drawings are intended to depict example embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
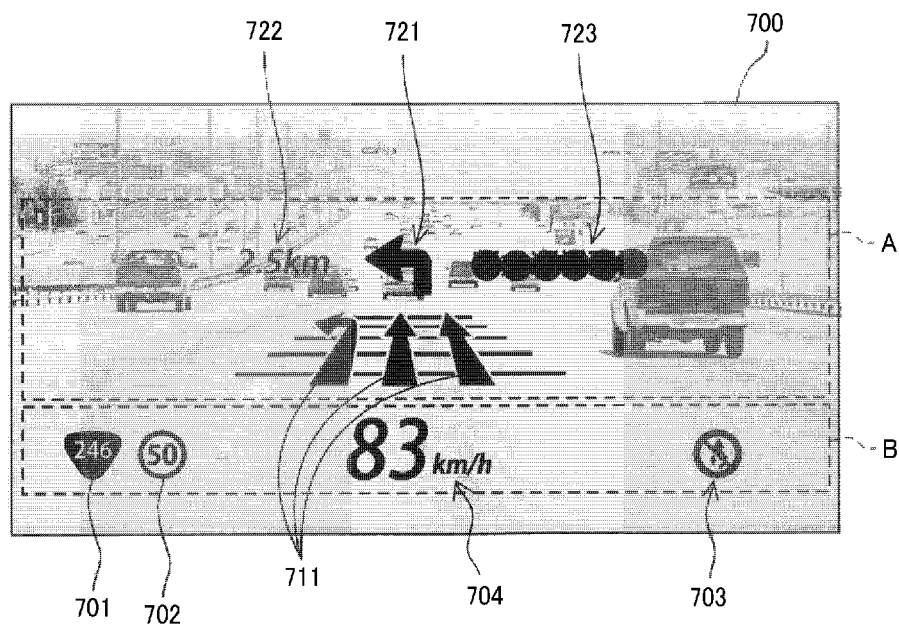
FIG. 1 is an explanatory view of an example of a virtual image according to an embodiment of the present disclosure that overlaps scenery in front of a host vehicle viewed by a driver through a front windshield and is displayed in a display area.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Figure 2:
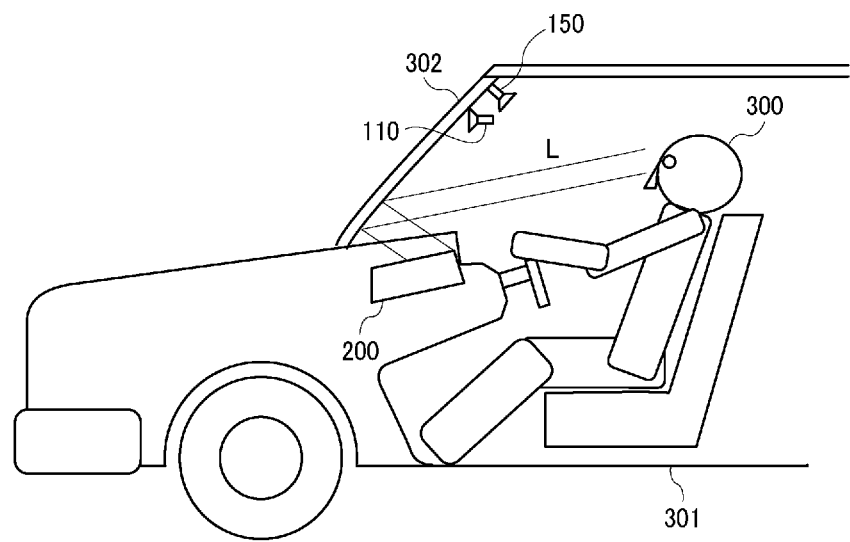
FIG. 2 is a schematic view of a configuration of an automobile on which an automotive HUD apparatus according to an embodiment of the present disclosure is mounted.
Figure 3:
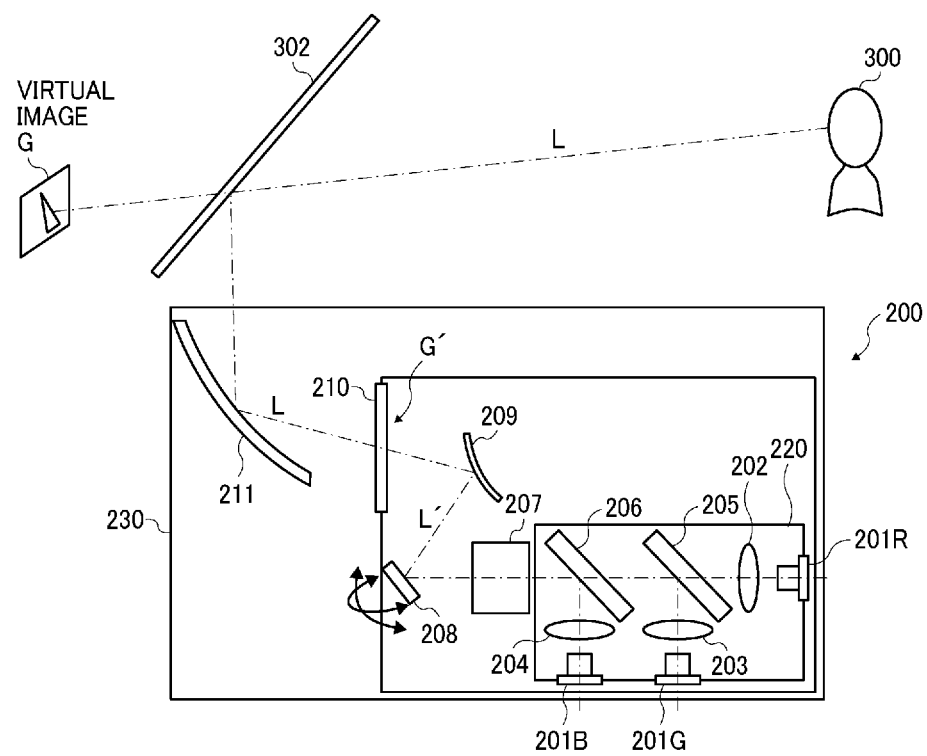
FIG. 3 is a schematic view of an internal configuration of the automotive HUD apparatus according to an embodiment of the present disclosure.

A description will be made below on an embodiment that is applied to a moving route guidance system including an automotive HUD apparatus as an image projection apparatus including a moving route guidance device according to the present disclosure. FIG. 1 is an explanatory view of an example of a virtual image that overlaps scenery in front of a host vehicle 301 viewed by a driver 300 through a front windshield 302 and displayed in a display area 700. FIG. 2 is a schematic view of a configuration of an automobile on which an automotive HUD apparatus according to the present embodiment is mounted. FIG. 3 is a schematic view of an internal configuration of the automotive HUD apparatus according to the present embodiment.

An automotive HUD apparatus 200 in the present embodiment is installed in a dashboard of the host vehicle 301 as a moving body, for example. Projection light L that is image light emitted from the automotive HUD apparatus 200 in the dashboard is reflected by the front windshield 302 as a light transmitting member and is directed to the driver 300. As a result, the driver 300 can visually recognize a HUD display image such as a navigation image, which will be described later, as a virtual image G. Alternatively, it may be configured to install a combiner as the light transmitting member on an inner wall surface of the front windshield 302 so as to cause the driver to visually recognize the virtual image by the projection light L reflected by the combiner.

The automotive HUD apparatus 200 is configured to include in a HUD body 230: red, green, and blue laser light sources 201R, 201G, and 201B; collimator lenses 202, 203, and 204 provided for the respective laser light sources; two dichroic minors 205 and 206; a light amount adjusting unit 207; a light scanning device 208 as light scanning means; a free-form surface minor 209; a microlens array 210 as a light diverging member; and a projection mirror 211 as a light reflecting member. In a light source unit 220 according to the present embodiment, the laser light sources 201R, 201G, and 201B, the collimator lenses 202, 203, and 204, and the dichroic minors 205 and 206 are unitized by an optical housing.

As each of the laser light sources 201R, 201G, and 201B, a semiconductor laser element (LD) can be used. A wavelength of luminous flux emitted from the red laser light source 201R is 640 nm, for example. A wavelength of luminous flux emitted from the green laser light source 201G is 530 nm, for example. A wavelength of luminous flux emitted from the blue laser light source 201B is 445 nm, for example.

The automotive HUD apparatus 200 according to the present embodiment projects an intermediate image, which is formed on the microlens array 210, onto the front windshield 302 of the host vehicle 301 so as to make the driver 300 visually recognize an enlarged intermediate image as the virtual image G. Respective types of the color laser light emitted from the laser light sources 201R, 201G, and 201B are changed to substantially parallel light by the collimator lenses 202, 203, and 204 and synthesized by the two dichroic minors 205 and 206. The light amount adjusting unit 207 adjusts a light amount of the synthesized laser light, and then the synthesized laser light is two-dimensionally scanned by a mirror of the light scanning device 208. Scanned light L' that is two-dimensionally scanned by the light scanning device 208 is reflected by the free-form surface mirror 209 and corrected for distortion. Then, the scanned light L' is focused on the microlens array 210 to draw the intermediate image.

In the present embodiment, the microlens array 210 is used as the light diverging member that individually diverges and emits the luminous flux for each pixel of the intermediate image (one point of the intermediate image). However, another light diverging member may be used. In addition, as a method for forming an intermediate image G', for example, another method using a liquid crystal display (LCD) or a vacuum fluorescent display (VFD) may be used.

However, in order to display the large virtual image G with high luminance, a laser scanning method is preferred as in the present embodiment. In the method using the LCD, the VFD, or the like, the light is also slightly irradiated on a non-image portion of a display area where the virtual image G is displayed, and it is difficult to completely block such light. Thus, there is a disadvantage that visibility of the scenery in front of the host vehicle 301 through the non-image portion is poor. On the other hand, according to the laser scanning method as in the present embodiment, in regard to the non-image portion in the display area of the virtual image G, when the laser light sources 201R, 201G, and 201B are turned off, the irradiation of the light on the non-image portion can completely be blocked. Thus, it is possible to avoid a situation where the visibility of the scenery in front of the host vehicle 301 through the non-image portion is lowered by the light irradiated from the automotive HUD apparatus 200. Therefore, there is an advantage that the visibility of the front scenery is high.

Furthermore, when display control is executed in a manner to increase the luminance of the display image stepwise, such display control has to be executed that the luminance of the target display image among the various display images displayed in the display area 700 is increased stepwise. The laser scanning method is also preferred when the display control is executed in the manner to partially increase the luminance of a part of the image in the display area 700, just as described. This is because, in the method using the LCD, the VFD, or the like, the luminance of the image other than the image displayed in the display area 700 is also increased, it is thus impossible to increase a luminance difference between the display images, and an effect of increasing the luminance of the image stepwise is not obtained sufficiently.

The light scanning device 208 tilts the mirror in a main scanning direction and a sub-scanning direction with a known actuator drive system such as Micro Electro Mechanical systems (MEMS), and performs two-dimensional scanning (raster scanning) of the laser light that enters the minor. Drive control of the mirror is executed in synchronization with light emission timing of the laser light sources 201R, 201G, and 201B. The configuration of the light scanning device 208 is not limited to the configuration described in the present embodiment. For example, the light scanning device 208 may be constituted of a mirror system including two minors that pivot or rotate about two orthogonal axes.

Figure 4:
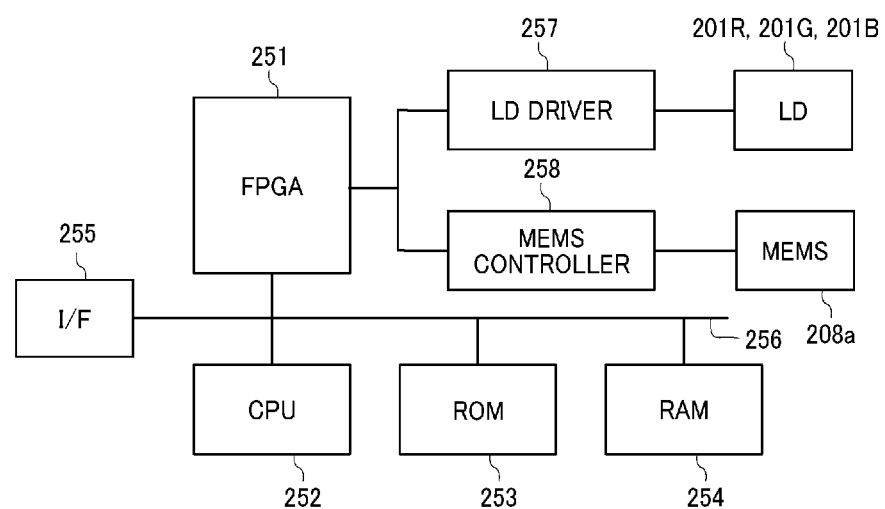
FIG. 4 is a hardware block diagram of a control system in the automotive HUD apparatus according to the embodiment of the present disclosure.

FIG. 4 is a hardware block diagram of a control system in the automotive HUD apparatus 200 according to the present embodiment. The control system of the automotive HUD apparatus 200 mainly includes a field-programmable gate array (FPGA) 251, a central processing unit (CPU) 252, read only memory (ROM) 253, random access memory (RAM) 254, an interface (I/F) 255, a bus line 256, a laser diode (LD) driver 257, and a MEMS controller 258. The FPGA 251 controls operation of laser light sources 201R, 201G, and 201B of the light source unit 220 by the LD driver 257, and controls operation of MEMS 208a of the light scanning device 208 by the MEMS controller 258. The CPU 252 controls each function of the automotive HUD apparatus 200. The ROM 253 stores various programs such as an image processing program executed by the CPU 252 to control the functions of the automotive HUD apparatus 200. The RAM 254 is used as a work area of the CPU 252. The I/F 255 is an interface to communicate with an external controller and the like, and is connected via a Controller Area Network (CAN) of the host vehicle 301 to an object recognition device 100, a vehicle navigation device 400, various sensors 500, and the like, which will be described later, for example.

Figure 5:
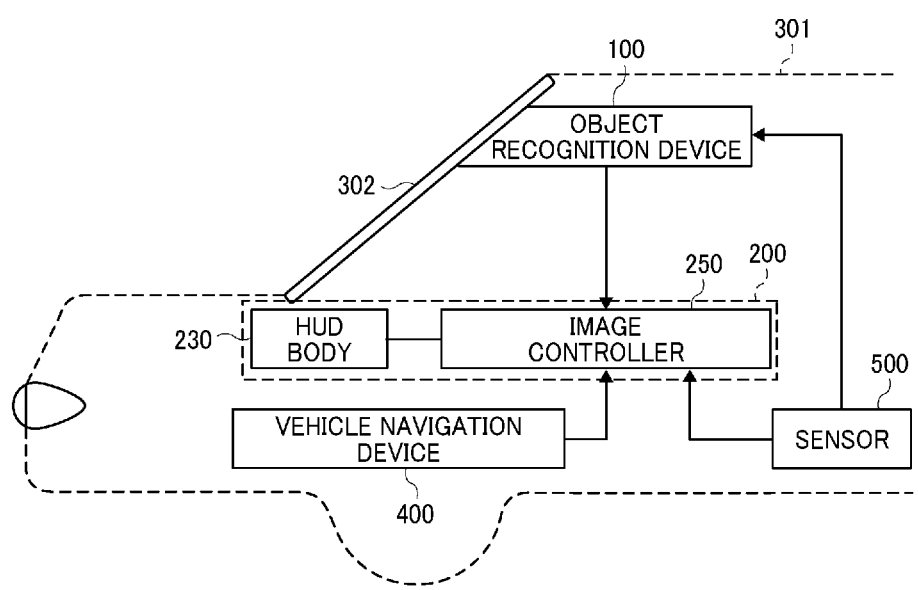
FIG. 5 is a block diagram of a schematic configuration of a moving route guidance system according to the embodiment of the present disclosure.

FIG. 5 is a block diagram of a schematic configuration of the moving route guidance system according to the present embodiment. The moving route guidance system according to the present embodiment includes the object recognition device 100, the vehicle navigation device 400, the sensors 500, and the like. The automotive HUD apparatus 200 in the present embodiment is mainly constructed of the HUD body 230 as image projection means and an image controller 250 as display control means.

The moving route guidance device according to the present embodiment may be constructed of the image controller 250 and the vehicle navigation device 400, or may further include the HUD body 230. In addition, all constituent devices of the travel route guidance system according to the present embodiment are mounted on the host vehicle 301. However, some of the constituent devices may be installed outside the host vehicle 301.

Figure 6:
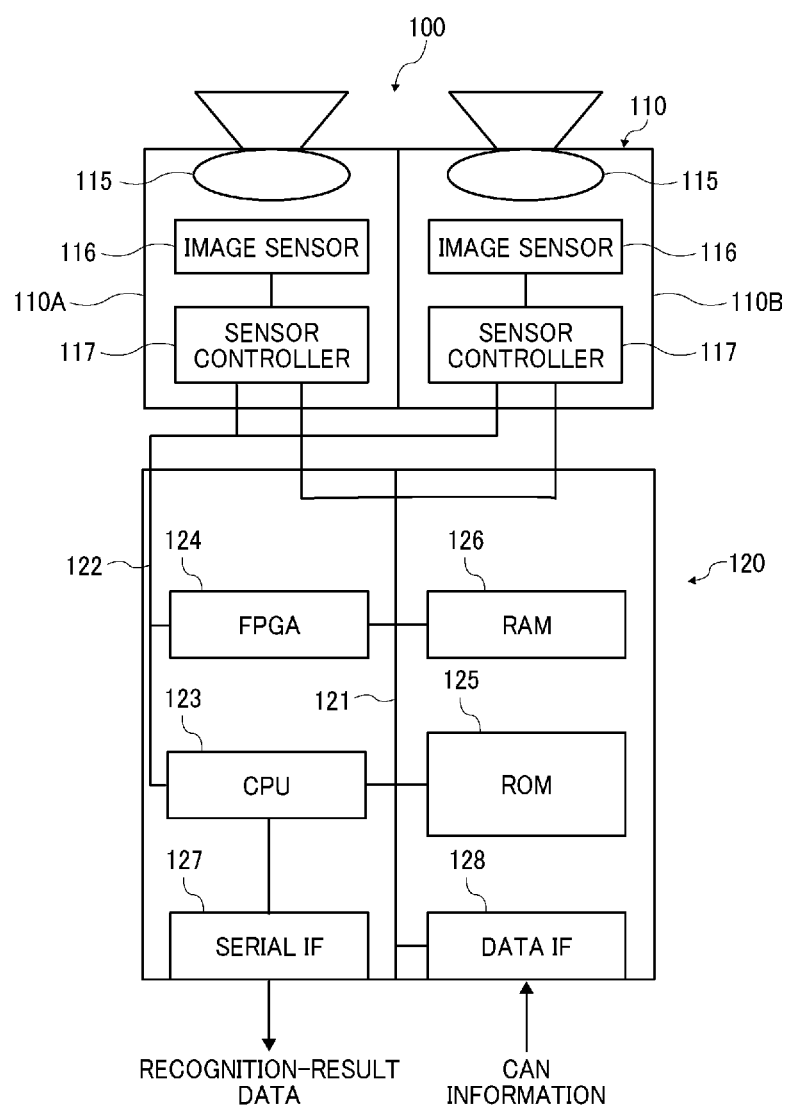
FIG. 6 is an explanatory diagram of a hardware configuration of an object recognition device in the moving route guidance system according to the embodiment of the present disclosure.

FIG. 6 is an explanatory diagram of a hardware configuration of the object recognition device 100 according to the present embodiment. The object recognition device 100 according to the present embodiment includes: a stereo camera unit 110 as image capturing means that captures a front area of the host vehicle 301 as an image capturing area; and an information processing unit 120 as image processing means that executes image processing to recognize a predetermined recognition target existing in the image capturing area based on captured image data captured by the stereo camera unit 110. Instead of the stereo camera unit 110, a configuration in which a monocular camera as the image capturing means and a laser radar (millimeter wave radar) as distance measuring means are combined may be adopted.

The stereo camera unit 110 is configured that two camera units, which are a first camera unit 110A for a left eye and a second camera unit 110B for a right eye are assembled in parallel. Each of the camera units 110A and 110B includes a lens 115, an image sensor 116, and a sensor controller 117. As the image sensor 116, for example, an image sensor constructed of a charge-coupled device (CCD) and a complementary metal-oxide-semiconductor (CMOS) can be used. The sensor controller 117 executes exposure control of the image sensor 116, image reading control, communication with an external circuit, transmission control of the image data, and the like. The stereo camera unit 110 is installed near a room minor on the front windshield 302 of the host vehicle 301.

The information processing unit 120 includes a data bus line 121, a serial bus line 122, a CPU 123, an FPGA 124, ROM 125, RAM 126, a serial IF 127, and a data IF 128.

The stereo camera unit 110 is connected to the information processing unit 120 via the data bus line 121 and the serial bus line 122. The CPU 123 executes and controls the control of the sensor controller 117 of the stereo camera unit 110, the overall operation of the information processing unit 120, the image processing, and the like. Luminance image data of the captured image captured by the image sensor 116 in each of the camera units 110A and 110B is written in the RAM 126 of the information processing unit 120 via the data bus line 121. Change control data of a sensor exposure value from the CPU 123 or the FPGA 124, change control data of the image reading parameter, various setting data, and the like are transmitted and received via a serial bus line 122.

The FPGA 124 executes processing that requires real time processing on the image data saved in the RAM 126, for example, gamma correction, distortion correction (parallelization of left and right images), and parallax calculation by block matching, so as to generate parallax images. Then, the FPGA 124 writes the parallax images in the RAM 126 again. The ROM 125 stores a recognition program to recognize the predetermined recognition object including a three-dimensional object such as a vehicle or a pedestrian, a lane boundary line such as a white line on a road surface, a curb existing on a side of the road surface, or a median strip. The recognition program is an example of an image processing program.

The CPU 123 acquires CAN information such as a vehicle speed, acceleration, a steering angle, and a yaw rate from the sensors 500 via the data IF 128, for example, via the CAN of the host vehicle 301. Then, in accordance with the recognition program stored in the ROM 125, the CPU 123 executes the image processing using the luminance image and the parallax images stored in the RAM 126 to recognize the recognition target such as a preceding vehicle 350 or the lane boundary line.

A recognition-result data of the recognition target is supplied to the external apparatuses such as the image controller 250 and a vehicle travel control unit via the serial IF 127. The vehicle travel control unit uses the recognition-result data of the recognition target to execute brake control, speed control, steering control, and the like of the host vehicle 301. In this way, the vehicle travel control unit executes, for example, cruise control that makes the host vehicle 301 automatically follow the preceding vehicle so as to keep a preset inter-vehicular distance, automatic brake control to avoid a collision or reduce a chance of the collision with a forward obstacle, and the like.

The vehicle navigation device 400 according to the present embodiment uses the HUD body 230 to display the route guidance image for guiding the driver 300 of the host vehicle 301 to the moving route (a travel route), so as to guide the driver to the moving route to a point that is set as a destination. Information necessary to generate a route navigation image to be displayed on the virtual image G is output from the vehicle navigation device 400, and such information is received by the image controller 250. For example, as illustrated in FIG. 1, the route navigation image includes images indicating information such as the number of the lanes (travel lanes) on a road where the host vehicle 301 currently travels, a distance to a point where a next course change (a right turn, a left turn, a branch, or the like) should be made, and a direction in which the next course change is made. When the image controller 250 receives such information from the vehicle navigation device 400, under the control of the image controller 250, the automotive HUD apparatus 200 displays the navigation images such as a travel lane instructing image 711, a course designating image 721, a remaining distance image 722, and an intersection name image 723 in an upper display area A of the display area 700.

In addition, in the image example illustrated in FIG. 1, an image indicating road specific information (a road name, a speed limit, and the like) is displayed in a lower display area B of the display area 700. The image controller 250 also receives such road specific information from the vehicle navigation device 400. The image controller 250 causes the automotive HUD apparatus 200 to display a road name display image 701, a speed limit display image 702, an overtaking prohibition display image 703, and the like, each of which corresponds to the road specific information, in the lower display area B of the display area 700.

The sensor 500 according to the present embodiment is constructed of one or more sensors used to detect various information indicating behavior of the host vehicle 301, a state of the host vehicle 301, a situation around the host vehicle 301, and the like. The sensor 500 outputs sensing information necessary to generate the image to be displayed the virtual image G, and the image controller 250 receives such sensing information. For example, in the image example illustrated in FIG. 1, a vehicle speed display image 704 (a character image of "83 km/h" in FIG. 1) indicating the vehicle speed of the host vehicle 301 is displayed in the lower display area B of the display area 700. For such a purpose, the image controller 250 receives vehicle speed information included in the CAN information of the host vehicle 301 from the sensor 500, and, under the control of the image controller 250, the automotive HUD apparatus 200 displays the character image indicating the vehicle speed in the lower display area B of the display area 700.

In addition to the sensor that detects the vehicle speed of the host vehicle 301, examples of the sensor 500 are: a laser radar and a capturing device that detect a distance from the other vehicle, the pedestrian, a construction structure (a guardrail, a utility pole, or the like) existing around (in front, on a side, at the rear) of the host vehicle 301; a sensor that detects external environment information (an outside air temperature, brightness, weather, and the like) of the host vehicle; a sensor that detects driving operation (a brake operation, an accelerator opening/closing degree, and the like) by the driver 300; a sensor that detects a remaining amount of fuel in a fuel tank of the host vehicle 301; and a sensor that detects a state of each of various in-vehicle devices such as an engine and a battery. When such information is detected by the sensor 500 and is transmitted to the image controller 250, the automotive HUD apparatus 200 can display such information as the virtual image G and provide such information to the driver 300.

Figure 7:
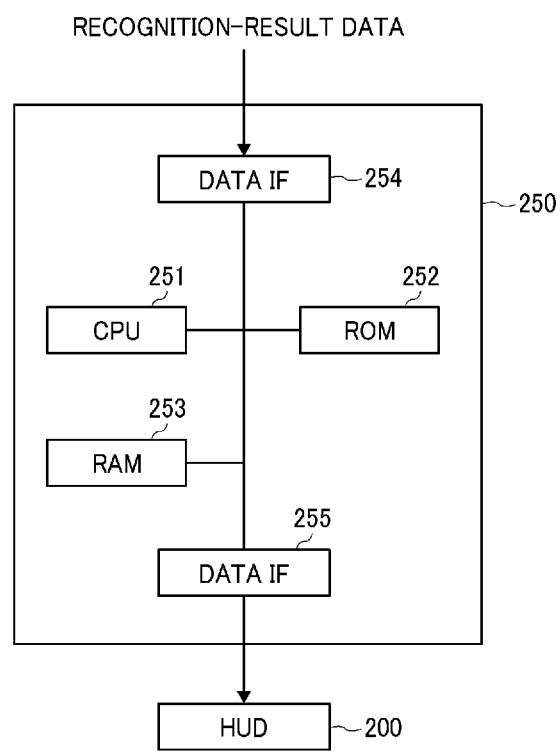
FIG. 7 is a hardware block diagram of a main hardware in an image controller in the automotive HUD apparatus according to the embodiment of the present disclosure.

FIG. 7 is a hardware block diagram of main hardware in the image controller 250. In the image controller 250, the CPU 252, the RAM 254, the ROM 253, and the IF 255 are connected to each other by the data bus line. The IF 255 receives various types of the recognition-result data output from the object recognition device 100, the sensing information output from the sensor 500, various types of the information output from the vehicle navigation device 400, and the like. The IF 255 outputs a control signal of the automotive HUD apparatus 200, and the like. The CPU 252 executes various computer programs such as an information provision control program stored in the ROM 253 or the like, so as to cause the image controller 250 to execute various types of control and various types of processing, which will be described later.

Figure 8:
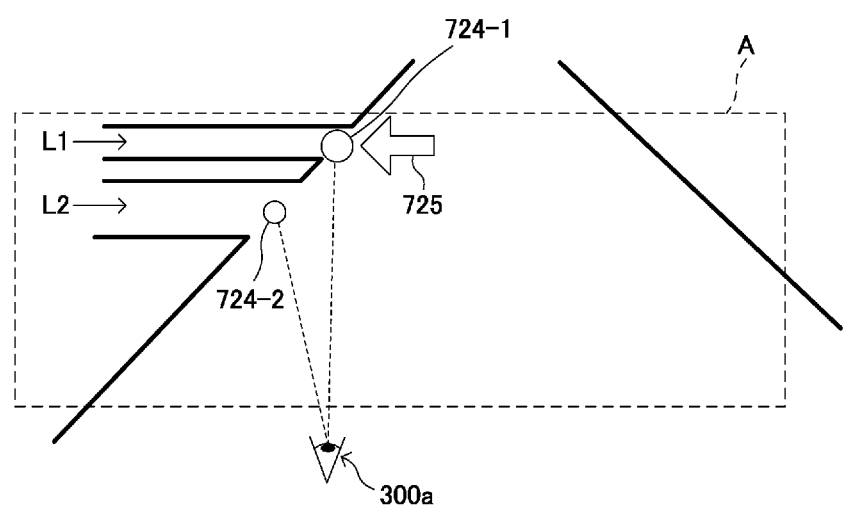
FIG. 8 is an explanatory view schematically illustrating an image example of a situation where a course is changed at a course change point such as an intersection according to the embodiment of the present disclosure.

Next, a description will be made on the virtual image G displayed by the automotive HUD apparatus 200. FIG. 8 is an explanatory view schematically illustrating an image example of a situation where the course is changed at the course change point such as an intersection. In the present embodiment, when the situation where the course is changed at the course change point comes, the image example illustrated in FIG. 1 is switched to the image example as illustrated in FIG. 8. In the image example illustrated in FIG. 8, the moving route guided at the course change point is a route to urge the left turn. However, as illustrated in FIG. 8, two left turnable routes (movable routes) L1 and L2 close to each other exist at such a course change point. Here, a description will be made on an example in which, of the two left turnable routes L1 and L2, a guide to a first left turnable route L1 located on a back side is provided.

The driver 300 recognizes a positional difference between actual points (entrances of the left turnable routes facing the road where the host vehicle 301 currently travels) of the two adjacent left turnable routes L1 and L2 as described above by a difference between visually recognized positions of the left turnable routes L1 and L2 (visually recognized positions of the entrances of the left turnable routes L1 and L2). Here, the actual points of the two left turnable routes L1 and L2, which are close to each other, differ in a host vehicle advancing direction (a depth direction visually recognized by the driver). Thus, unlike a case where the actual positions differ in a lateral direction or a vertical direction, the difference in the visually recognized positions (the vertical positions) is small. For such a reason, it is difficult for the driver 300 to recognize the difference in the position between the actual points of the two left turnable routes L1 and L2.

The typical apparatus displays the route guidance image (such as an arrow image pointing in a course direction) in a manner to correspond to the actual point in the movement route. In this way, the typical apparatus attempts the driver to intuitively recognize the course on which the host vehicle 301 should travel (the moving route to be guided). However, in the case where the typical apparatus guides to one (the first left turnable route L1) of the two left turnable routes L1 and L2, which are close to each other, as in the present example, the visually recognized positions of the two left turnable routes L1 and L2 are too close to make the driver 300 accurately recognize which of the left turnable routes L1 and L2, a displayed position in the route guidance image corresponds for display.

In view of the above, in the present embodiment, as illustrated in FIG. 8, in the case where the guide to one (the first left turnable route L1) of the two left turnable routes L1 and L2, which are close to each other, is provided, two route identification images 724-1 and 724-2 respectively corresponding to the two left turnable routes L1 and L2 are displayed in the upper display area A of the display area 700 in a manner to correspond to a visually recognized position relationship between the two left turnable routes L1 and L2 by the driver 300.

The visually recognized position relationship described here means a relative positional relationship of the visually recognized positions of the two left turnable routes L1 and L2, which are actually and visually recognized by the driver 300. The example illustrated in FIG. 8 represents such a visually recognized position relationship that the visually recognized position of the first left turnable route L1 is located higher than the visually recognized position of the second left turnable route L2. Thus, the first route identification image 724-1, which corresponds to the first left turnable route L1, is displayed above the second route identification image 724-2, which corresponds to the second left turnable route L2. The example illustrated in FIG. 8 also represents such a visually recognized position relationship that the visually recognized position of the first left turnable route L1 (the visually recognized position of the entrance of the first left turnable route L1) is located on a right side of the visually recognized position of the second left turnable route L2 (the visually recognized position of the entrance of the second left turnable route L2). Thus, the first route identification image 724-1, which corresponds to the first left turnable route L1, is displayed on the right side of the second route identification image 724-2, which corresponds to the second left turnable route L2.

It should be noted that display positions of the two route identification images 724-1 and 724-2 do not have to strictly correspond to the visually recognized position relationship between the two left turnable routes L1 and L2 by the driver 300, and may correspond to the visually recognized position relationship to such extent that a corresponding relationship between the route identification images 724-1 and 724-2 and the left turnable routes L1 and L2 can intuitively be grasped.

In the present embodiment, a route instructing image 725 is displayed in association with the route identification image corresponding to the route to be guided of the two thus-displayed route identification images 724-1 and 724-2. In the image example illustrated in FIG. 8, of the two left turnable routes L1 and L2, the route to be guided is the first left turnable route L1. Thus, the route instructing image 725 is displayed in association with the first route identification image 724-1, which corresponds to the first left turnable route L1.

The association between the route identification image, which corresponds to the route to be guided, and the route instructing image may have a relevance to such extent that the driver can intuitively grasp which of the two route identification images 724-1 and 724-2 is selected in the route instructing image 725. In the image example illustrated in FIG. 8, the route instructing image 725 is the arrow image. Thus, the route instructing image 725 is displayed such that the first route identification image 724-1 is positioned ahead in an arrow direction of the arrow image.

As described above, in the present embodiment, the two route identification images 724-1 and 724-2 respectively corresponding to the two left turnable routes L1 and L2, which are close to each other, are displayed instead of the actual positions of the two left turnable routes L1 and L2, and the route identification image 724-1, which corresponds to the route to be guided, is designated in the route instructing image 725. In this way, the driver is guided which of the left turnable routes L1 and L2 is the guided target left turning route. According to the above, even in a situation where it is difficult to recognize the positional difference between the actual points of the two left turnable routes L1 and L2, which are close to each other, the driver can accurately recognize which of the two left turnable routes L1 and L2 is the left turning route to be guided.

Each of the route identification images 724-1 and 724-2 in the present embodiment is a circular image. However, contents of each of the images such as the shape, size and a color of each of the image are not particularly limited. However, the contents such as the shape, the size, and the color of the first route identification image 726-1 are preferably determined such that the first route identification image 726-1, which corresponds to the route to be guided (the first left turnable route L1) is more emphasized than the second route identification image 726-2.

Figure 9:
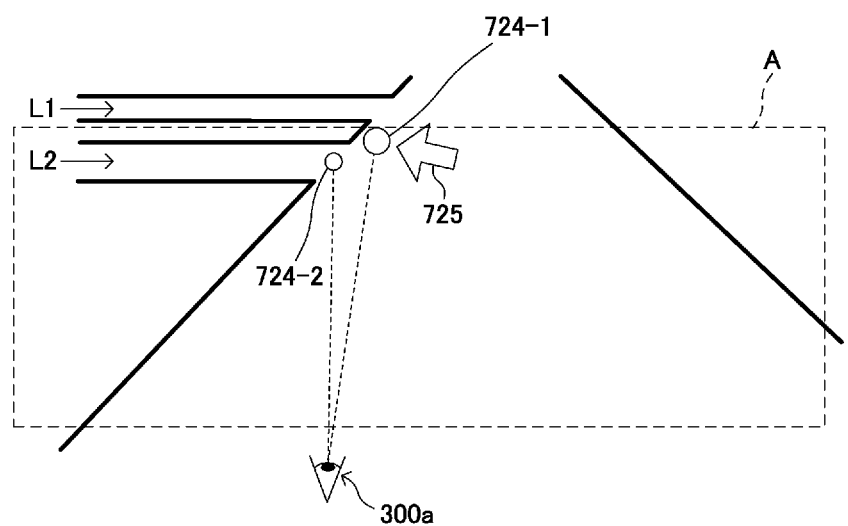
FIG. 9 is an explanatory view schematically illustrating another image example of the situation where the course is changed at the course change point such as the intersection according to the embodiment of the present disclosure.

FIG. 9 is an explanatory view schematically illustrating another image example of the situation where the course is changed at the course change point such as the intersection. The image example illustrated in FIG. 8 is the example in which the upper display area A as a display area capable of displaying the route guidance image including the route identification images 724-1 and 724-2 and the route instructing image 725 overlaps the visually recognized positions of the two left turnable routes L1 and L2, which are close to each other. Accordingly, in the image example illustrated in FIG. 8, the route identification images 724-1 and 724-2 are displayed in the manner to overlap the actual positions of the corresponding left turnable routes L1 and L2 (the entrance positions of the left turnable routes L1 and L2). In this way, the corresponding relationships between the route identification images 724-1 and 724-2 and the left turnable routes L1 and L2 are made clear.

On the contrary, the image example illustrated in FIG. 9 is an example in which the visually recognized position of the first left turnable route L1 among the two left turnable routes L1 and L2 does not overlap the upper display area A. In this example, the first route identification image 724-1 cannot be displayed in the manner to overlap the actual position of the corresponding first left turnable route L1 (the entrance position of the first left turnable route L1).

However, even in such a case, in the present embodiment, the two route identification images 724-1 and 724-2, which respectively correspond to the two left turnable routes L1 and L2, are displayed in the upper display area A of the display area 700, so as to correspond to the visually recognized position relationship between the two left turnable routes L1 and L2 by the driver 300. Accordingly, even in the case where the route identification image 724-1 is not displayed in the manner to overlap the actual position of the left turnable route L1 (the entrance position of the left turnable route L1), the driver 300 can intuitively grasp which of the two route identification images 724-1 and 724-2 each of the two left turnable routes L1 and L2, which are actually and visually recognized, corresponds.

In addition, in the image example illustrated FIG. 9, the first route identification image 724-1 corresponding to the first left turnable route L1, which does not overlap the upper display area A, is displayed at a position in the upper display area A overlapping a line of vision S1 of the driver 300 with respect to the first left turnable route L1. In this way, the driver 300 can further intuitively grasp that the first route identification image 724-1 corresponds to the actual first left turnable route L1 a head of the line of vision.

In order to determine the line of vision S1 of the driver 300, a viewpoint 300a of the driver 300 is specified. The viewpoint 300a of the driver 300 may be determined at a particular point within a predefined automotive driver's eye range. Alternatively, a camera or a sensor that detects a head position or an eye position of the driver may be provided to specify the viewpoint 300a of the driver 300 based on a detection result.

In addition, as the host vehicle 301 advances, a distance between each of the two left turnable routes L1 and L2, each of which exists in front of the host vehicle, and the host vehicle 301 is reduced. Thus, the visually recognized positions and magnitudes of visual recognition of the two actual left turnable routes L1, L2 (the entrance positions of the left turnable routes L1, L2), which are visually recognized by the driver 300, are changed in conjunction with the advancement of the host vehicle 301. In the present embodiment, in the vehicle navigation device 400, the map information that includes the position information of the two left turnable routes L1 and L2 and the position information of the host vehicle 301 such as a GPS (Global Positioning System) position information are grasped. The image controller 250 according to the present embodiment changes at least one of the contents and the display positions of the route identification images 724-1 and 724-2 and the route instructing image 725 based on the map information and the position information, just as described.

Figure 10A:
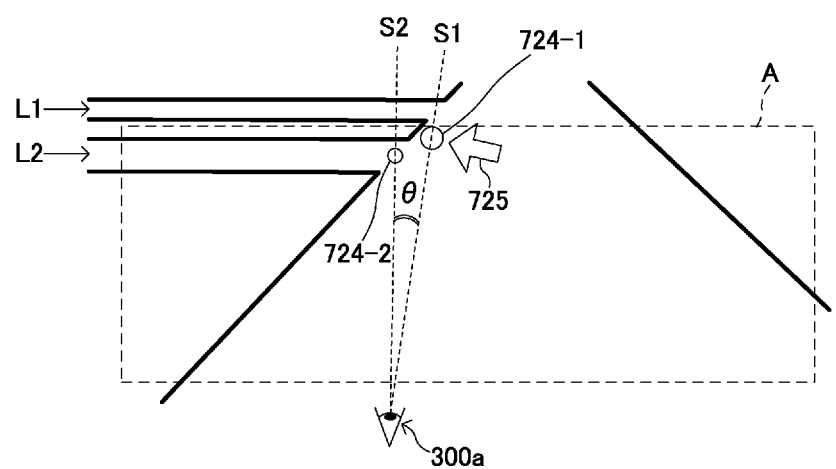
FIGS. 10A to 10C (FIG. 10) are explanatory views, each of which schematically illustrates an image example for each distance between the host vehicle and each of two left turnable routes according to the embodiment of the present disclosure.
Figure 10B:
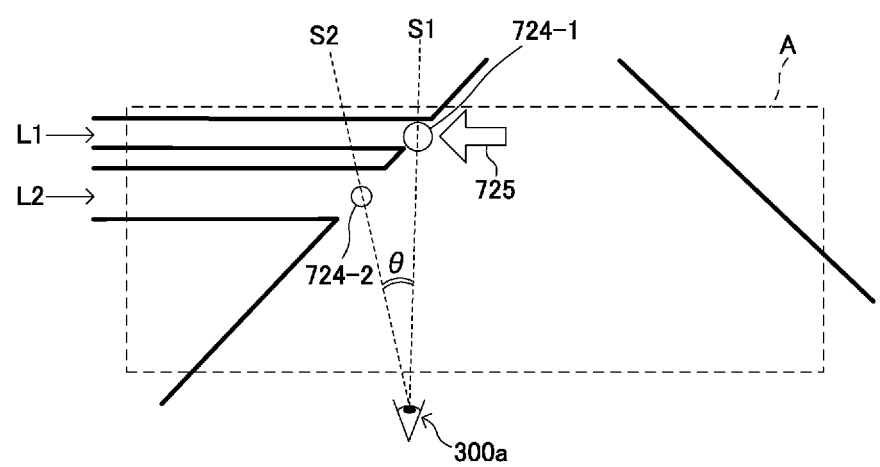
Figure 10C:
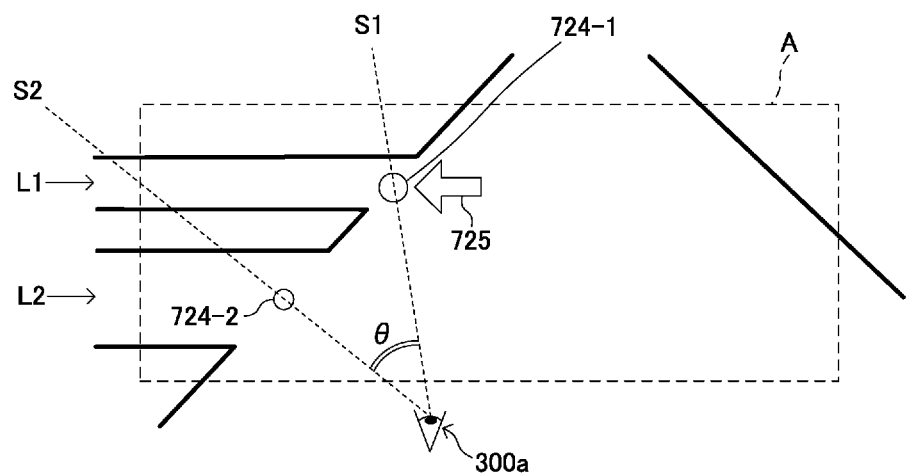
Figure 11:
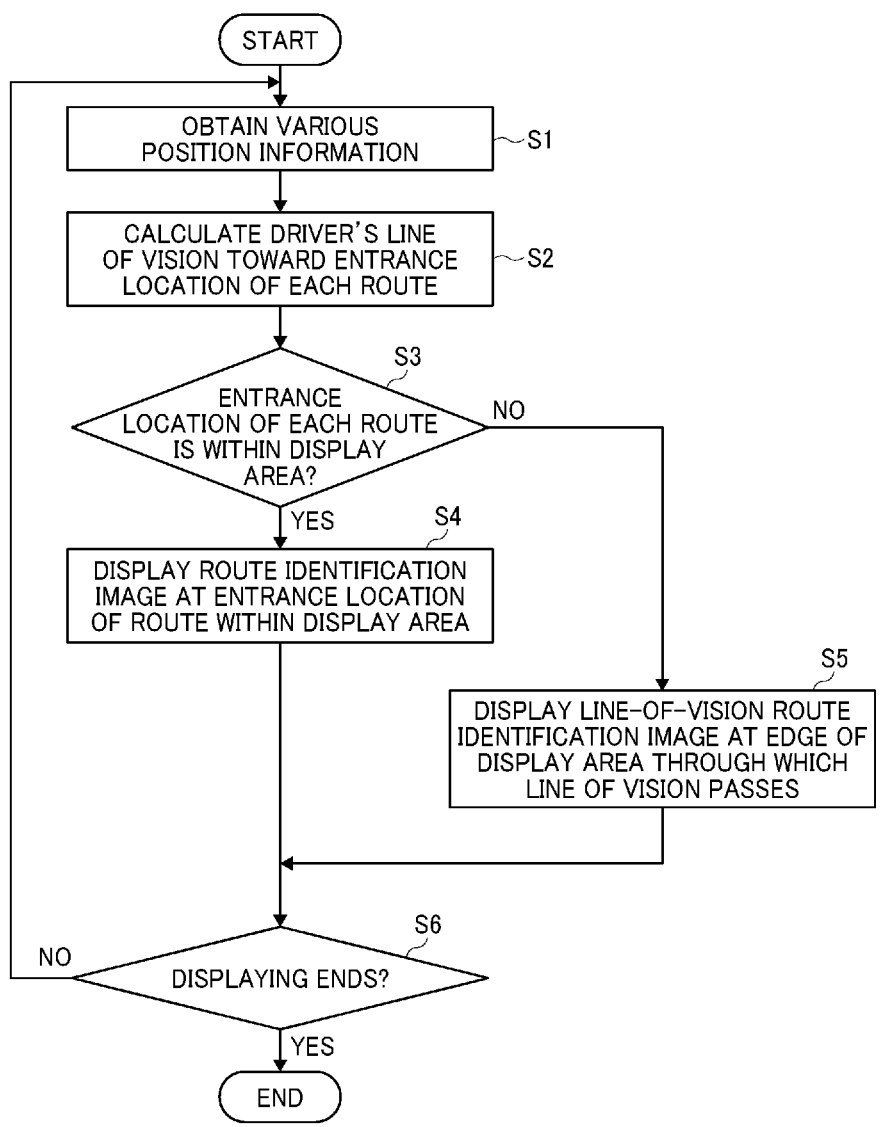
FIG. 11 is a flowchart of a display control procedure to change a route identification image and a route instructing image according to the embodiment of the present disclosure.

FIGS. 10A to 10C are explanatory views, each of which schematically illustrates an image example for each distance between the host vehicle 301 and each of two left turnable routes L1 and L2. FIG. 11 is a flowchart of a display control procedure to change the route identification images and the route instructing image. In a situation where the distance to each of the two left turnable routes L1 and L2 is still long, for example, as illustrated in FIG. 10A, the visually recognized position of the second left turnable route L2 on the near side (the entrance position of the second left turnable route L2) overlaps the upper display area A. Meanwhile, the visually recognized position of the first left turnable route L1 on the back side (the entrance position of the first left turnable route L1) does not overlap the upper display area A. In such a case, the image controller 250 displays the second route identification image 724-2 in the overlapping manner with the visually recognized position of the corresponding second left turnable route L2. Meanwhile, the image controller 250 displays the first route identification image 724-1 at the position, which overlaps the line of vision S1 of the driver 300 with respect to the first left turnable route L1, in the upper display area A without causing the first route identification image 724-1 to overlap the visually recognized position of the corresponding first left turnable route L1.

More specifically, the image controller 250 obtains the position information (the information on the entrance positions) of the two left turnable routes L1 and L2 obtained from the map information, and the position information on the host vehicle 301, and the position information on the viewpoint 300a of the driver 300 (S1). From these types of the information, the lines of vision S1 and S2 of the driver 300 that respectively connect the viewpoint 300a of the driver and the positions (the entrance positions) of the left turnable routes L1 and L2 are calculated (S2).

Next, from the calculated lines of vision S1 and S2, it is determined whether the entrance positions (the visually recognized positions) of the two left turnable routes L1 and L2 overlap the upper display area A (S3). In such a determination, in regard to the second left turnable route L2 determined that the entrance position overlaps the upper display area A, as illustrated FIG. 10A, the second route identification image 724-2 is displayed at the visually recognized position of the second left turnable route L2 in the upper display area A. Meanwhile, in regard to the first left turnable route L1 determined that the entrance position does not overlap the upper display area A, as illustrated FIG. 10A, the first route identification image 724-1 is displayed at an edge position of the upper display area A through which the line of vision S1 of the driver 300 with respect to the first left turnable route L1 passes (S5).

The display control that has been described so far is repeatedly executed until a display end condition, such as a condition that the host vehicle 301 passes one of the left turnable routes L1 and L2, is satisfied (S6). Accordingly, if the host vehicle 301 advances and the entrance position of the left turnable route L1 overlaps the inside of the upper display area A (Yes in S3), as illustrated in FIG. 10B, the first route identification image 724-1 is displayed at the visually recognized position of the first left turnable route L1 in the upper display area A (S4).

As the host vehicle 301 advances, an angle (a line of vision angle) θ defined by the line of vision S1 with respect to the first left turnable route L1 and the line of vision S2 with respect to the second left turnable route L2 is changed every moment as illustrated in FIGS. 10A to 10C. In addition, as the host vehicle 301 advances, the entrance positions of the left turnable routes L1 and L2 in the upper display area A are changed every moment. In the present embodiment, while the lines of vision S1 and S2 and the entrance positions are changed every moment, the display positions of the route identification images 724-1 and 724-2 as well as the position and orientation (orientation of the arrow) of the route instructing image 725 associated with the first route identification image 724-1 and the like in the upper display area A are changed every moment. As a result, while the visually recognized positions, the magnitudes of the visual recognition, and the like of the two left turnable routes L1 and L2 that are visually recognized are changed every moment, the driver 300 of the currently moving host vehicle 301 can keep recognizing the relationship between each of the displayed route identification images 724-1 and 724-2 and the displayed route instructing images 725 and the actual left turnable routes L1 and L2.

The changes in the route identification images 724-1 and 724-2 are not limited to the changes in the display positions. For example, the image contents such as the size, the color, and the shape may be changed. For example, as the distances to the entrance positions of the left turnable routes L1 and L2 are reduced, the route identification images 724-1 and 724-2 may be changed to be enlarged, or the route identification images 724-1 and 724-2 may be changed such that the brightness is lowered.

In particular, the angle θ, which is defined by the lines of vision S1 and S2 from the viewpoint 300a of the driver 300 to the entrance positions of the left turnable routes L1 and L2 is increased every moment as illustrated in FIGS. 10A to 10C as the host vehicle 301 approaches the entrance positions of the left turnable routes L1 and L2. In this way, the driver 300 easily recognizes a spatial position difference between the left turnable routes L1 and L2. Thus, as the host vehicle 301 approaches the entrance positions of the left turnable routes L1 and L2, the necessity of the route identification images 724-1 and 724-2 is also decreased. For such a reason, in the case where the contents of the route identification images 724-1 and 724-2 are changed, the route identification images 724-1 and 724-2 are preferably changed such that visibility of the route identification images 724-1 and 724-2 is decreased as the host vehicle 301 approaches the entrance positions of the left turnable routes L1 and L2.

As a method for changing the route identification images 724-1 and 724-2, the route identification images 724-1 and 724-2 may be changed every time the line of view angle θ exceeds each threshold of one, two, or more stages. Alternatively, the route identification images 724-1 and 724-2, the route identification images 724-1 and 724-2 may be changed continuously in accordance with a calculation result based on the line of view angle θ without using the threshold. For example, when weight on a parameter (the luminance, the size, or the like) as a target to be changed in each of the route identification images 724-1 and 724-2 is set as "W" (0≤W≤1), the parameter of each of the route identification images 724-1 and 724-2 may be changed using the weight W obtained from the line of view angle θ by the following formula (1), so as to change the route identification images 724-1 and 724-2.

$$W=(2\pi-\theta)/2\pi \quad (1)$$

Similarly, the change in the route instructing image 725 is not limited to the change in the display position. For example, the image contents of the route instructing image 725 such as the size, the color, and the shape may be changed.

In addition, in order to increase calculation accuracy of the lines of vision S1 and S2 of the driver with respect to the left turnable routes L1 and L2, the recognition-results of the entrances of the left turnable routes L1 and L2 by the object recognition device 100 may be used. More specifically, for example, the object recognition device 100 recognizes a road edge or a side strip ahead of the host vehicle, and detects a break of the road edge or the side strip as the entrance of each of the left turnable routes L1 and L2 from the recognition-result. The calculation result of the lines of vision S1 and S2 of the driver is corrected based on the information on the entrance positions of each of the left turnable routes L1 and L2 specified from such a detection result.

In addition, in the present embodiment, the display method in the situation where the entrance positions (the visually recognized positions) of the left turnable routes L1 and L2 do not overlap the upper display area A is the method for displaying the route identification images 724-1 and 724-2 at the edge positions in the upper display area A that the line of vision S1 of the driver 300 with respect to the left turnable routes L1 and L2 passes. However, the display method is not limited to such a method.

Figure 12:
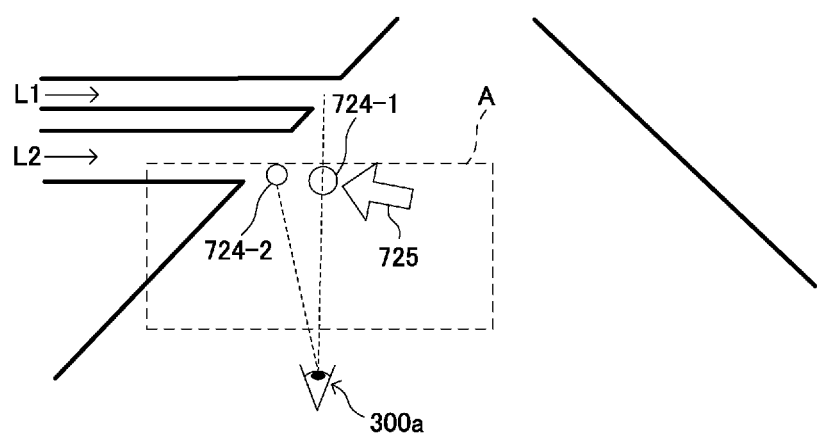
FIG. 12 is an explanatory view schematically illustrating yet another image example of the situation where the course is changed at the course change point such as the intersection according to the embodiment of the present disclosure.

For example, in the case where the upper display area A as the display area capable of displaying the route guidance image including the route identification images 724-1 and 724-2 and the route instructing image 725 is small, none of the two left turnable routes L1 and L2 may overlap the upper display area A. In such a case, when the method for displaying the route identification images 724-1 and 724-2 at the edge positions, which the lines of vision S1 and S2 of the driver 300 with respect to the left turnable routs L1 and L2 pass, in the upper display area A, an image example as illustrated in FIG. 12 may be generated. In such an image example, it may be erroneously recognized that the route instructing image 725 pointing to the first route identification image 724-1 points to the entrance position of the second left turnable route L2.

Figure 13:
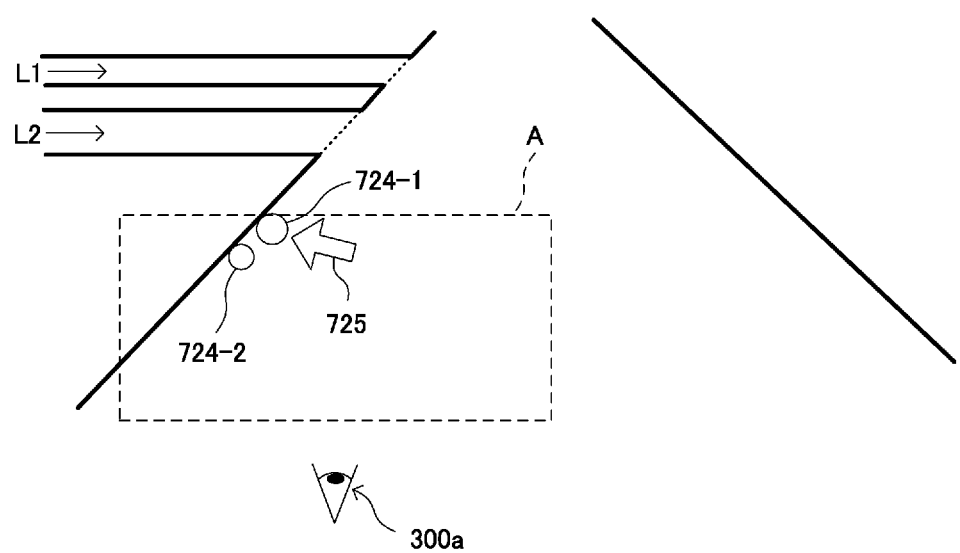
FIG. 13 is an explanatory view schematically illustrating further another image example of the situation where the course is changed at the course change point such as the intersection according to the embodiment of the present disclosure.

Meanwhile, for example, as illustrated in FIG. 13, a method for displaying the route identification images 724-1 and 724-2 in the upper display area A along the road edge or the side strip of the road where the host vehicle 301 currently travels while corresponding to the visually recognized position relationship between the two left turnable routes L1 and L2 by the driver 300 may be adopted. That is, along the road edge or the side strip of the road where the host vehicle 301 currently travels, the first route identification image 724-1, which corresponds to the first left turnable route L1 on the back side, may be displayed on the upper side (the back side in an actual space), and the second route identification image 724-2, which corresponds to the second left turnable route L2 on the front side, may be displayed on the lower side (the front side in the actual space).

Figure 14A:
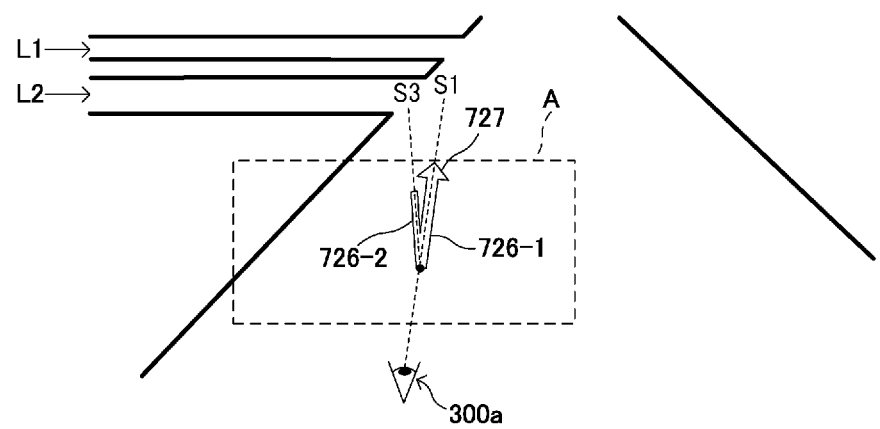
FIGS. 14A to 14C (FIG. 14) are explanatory views, each of which schematically illustrates an image example for each distance between the host vehicle and each of the two left turnable routes according to a first variation example of the present disclosure.
Figure 14B:
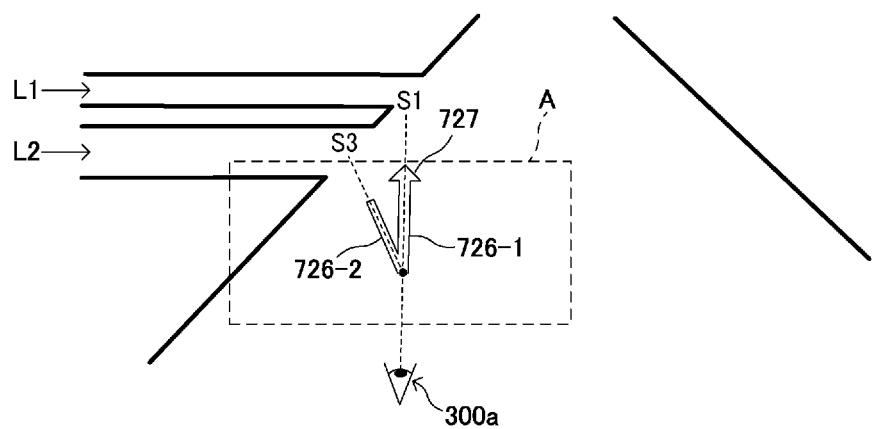
Figure 14C:
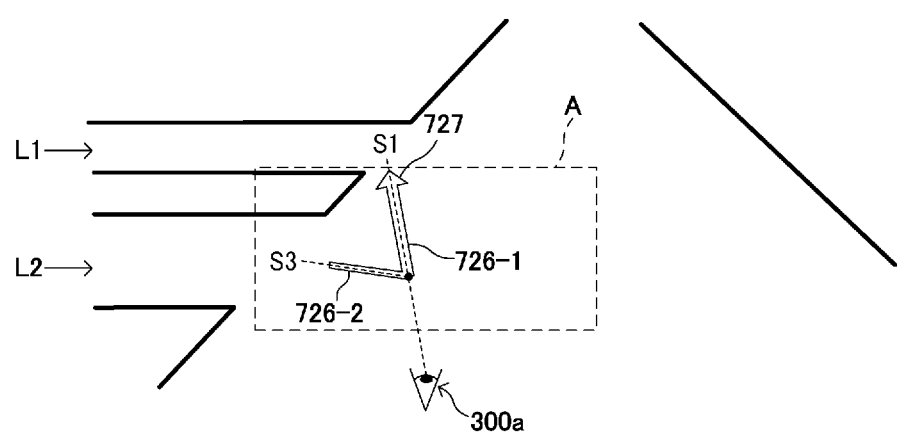

Next, a description will be made on a variation example (hereinafter, the present variation example will be referred to as a "first variation example") of the route guidance image in the above-described embodiment. FIGS. 14A to 14C are explanatory views, each of which schematically illustrates an image example for each distance between the host vehicle 301 and each of two left turnable routes L1 and L2 according to the present first variation example. Each of the image examples illustrated in FIGS. 14A to 14C illustrates another example of the route identification image and the route instructing image, which constitutes the route guidance image. In the present example, two route identification images 726-1 and 726-2 respectively corresponding to the two left turnable routes L1 and L2, which are close to each other, are formed by branch images branched for the two left turnable routes L1 and L2. A route instructing image 727 that is displayed in association with the route identification image 726-1 corresponding to the route to be guided (the first left turnable route L1) is formed by the arrow image continuous to the route identification image 726-1.

The arrow formed by the first route identification image 726-1 and the route instructing image 727 corresponding to the route to be guided (the first left turnable route L1) is displayed in a manner to be directed parallel with the line of vision S1 of the driver 300 with respect to the first left turnable route L1 and to overlap the line of vision S1. Meanwhile, the second route identification image 726-2 is an elongated figure displayed along a line segment that connects a base point of the arrow formed by the first route identification image 726-1 and the route instructing image 727 and the entrance position (the visually recognized position) of the second left turnable route L2, and a tip of the second route identification image 726-2 is not an arrow. Moreover, in order to emphasize the first route identification image 726-1 more than the second route identification image 726-2, the second route identification image 726-2 is formed to be thinner and shorter than the first route identification image 726-1.

Next, a description will be made on another variation example (hereinafter, the present variation example will be referred to as a "second variation example") of the route guidance image in the above-described embodiment. In each of the embodiment and the first variation example described above, the example of the case where the host vehicle 301 turns to the left to change the course has been described. In the present second variation example, an example of a course changing case where the host vehicle 301 that travels on a three-lane road on one side changes the lane will be described.

Figure 15:
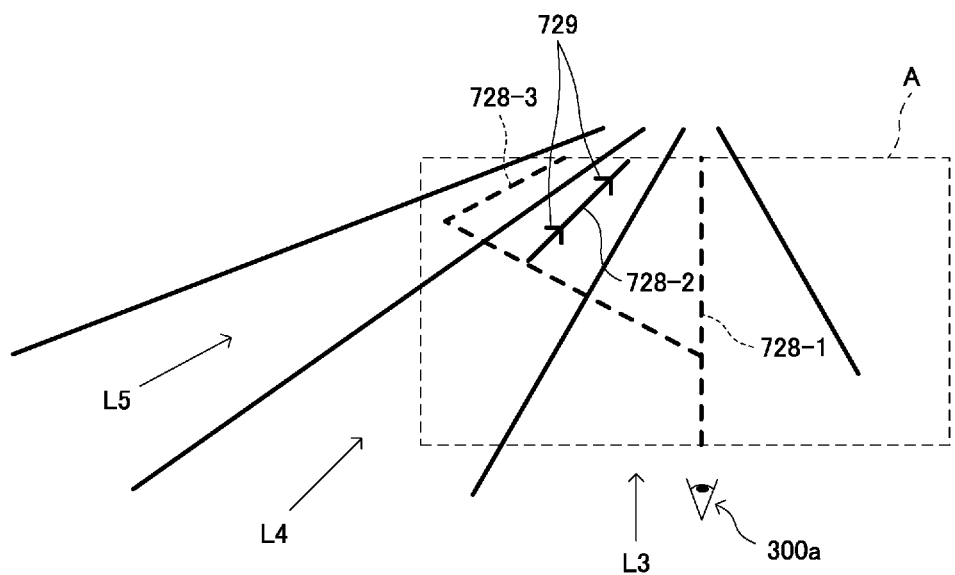
FIG. 15 is an explanatory view schematically illustrating an image example of a route guidance image for guiding a course change (a lane change) according to a second variation example of the present disclosure.

FIG. 15 is an explanatory view schematically illustrating an image example of the route guidance image for guiding the course change (the lane change) according to the second variation example. In the image example illustrated in FIG. 15, when traveling on a right lane route L3 of the three lanes on the one side, the host vehicle 301 is guided (urged) by the route guidance image in a manner to change the lane to a central lane route L4 of remaining two lane routes (a route traveling on the central lane route L4 and a route traveling on a left lane route L5) that are close to each other among the three lanes on the one side.

In the present second variation example, as illustrated in FIG. 15, three route identification images 728-1, 728-2, and 728-3 respectively corresponding to the three lane routes L3, L4, and L5 are displayed in the upper display area A of the display area 700, so as to correspond to a visually recognized position relationship among the three lane routes L3, L4, and L5 by the driver 300. The example illustrated in FIG. 15 illustrates such a visually recognized position relationship that the visually recognized position of the right lane route L3 is positioned on a right side of the visually recognized position of the central lane route L4 and that the visually recognized position of the central lane route L4 is located on the right side of the visually recognized position of the left lane route L5. Thus, the first route identification image 728-1 corresponding to the right lane route L3 is displayed on the right side of the second route identification image 728-2 corresponding to the central lane route L4, and the second route identification image 728-2 corresponding to the central lane route L4 is displayed on the right side of the third route identification image 728-3 corresponding to the left lane route L5.

Also, in the present second variation example, a route instructing image 729 is displayed in association with the route identification image corresponding to the route to be guided of the three route identification images 728-1, 728-2, and 728-3 displayed as described above. In the image example illustrated in FIG. 15, of the three lane routes L3, L4, and L5, the route to be guided is the central lane route L4. Thus, the route instructing image 729 is displayed in association with the second route identification image 728-2, which corresponds to the central lane route L4.

More specifically, the three route identification images 728-1, 728-2, and 728-3 respectively corresponding to the three lane routes L3, L4, and L5 that are close to each other are formed by the branch images branched for the three lane routes L3, L4, and L5. The route instructing image 729 that is displayed in association with the second route identification image 728-2 corresponding to the route to be guided (the central lane route L4) is formed by the arrow image coupled to the route identification image 728-2. In addition, the two route identification images 728-1 and 728-3 are each formed by a broken line, and the second route identification image 726-2 is formed by a solid line such that the second route identification image 728-2 corresponding to the route to be guided (the central lane route L4) is more emphasized than the remaining two route identification images 728-1 and 728-3.

As illustrated in FIG. 15, the three route identification images 728-1, 728-2, and 728-3 are displayed in a manner to overlap center lines of the respective lane routes L3, L4, and L5 such that the three route identification images 728-1, 728-2, and 728-3 are visually recognized by the driver along the center lines of the respective lane routes L3, L4, and L5.

As described above, in the present second variation example, instead of the actual positions of the three lane routes L3, L4, and L5 that are close to each other, the route identification images 728-1, 728-2, and 728-3 corresponding to these lane routes L3, L4, and L5 are separately displayed, and the route identification image 728-2, which corresponds to the route to be guided, is instructed by the route instructing image 729. In this way, the driver is guided which of the lane routes L3, L4, and L5 is the guided target lane route. According to the above, even in a situation where it is difficult to recognize the positional difference among the actual points of the three lane routes L3, L4, and L5, which are close to each other, the driver can accurately recognize which of the three lane routes L3, L4, and L5 is the lane route to be guided.

Figure 16:
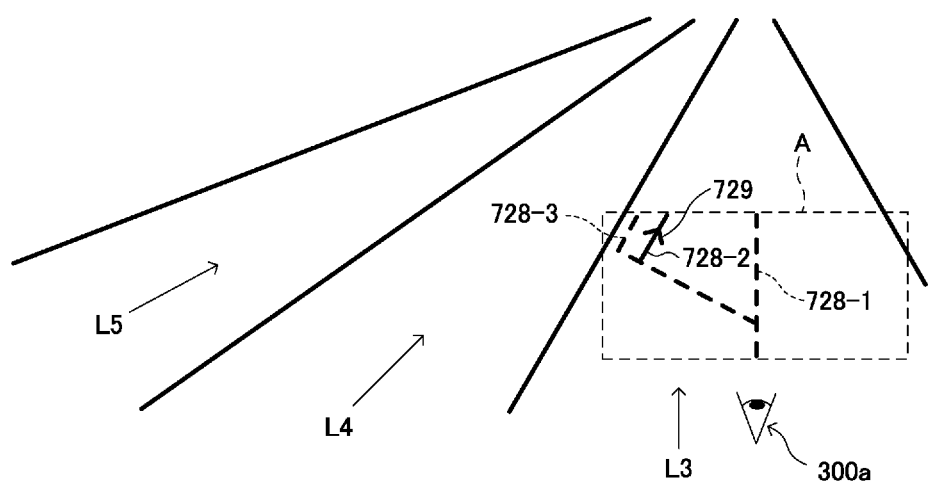
FIG. 16 is an explanatory view schematically illustrating another image example of the route guidance image for guiding the course change (the lane change) according to the second variation example of the present disclosure.

As illustrated in FIG. 16, in the case where the upper display area A as the display area capable of displaying the route guidance image including the route identification images 728-1, 728-2, and 728-3 and the route instructing image 729 is small, the lane routes L4 and L5 may not overlap the upper display area A. In such a case, the route identification images 728-2 and 728-3 is not displayed in the manner to overlap the center lines of the respective corresponding lane route L4 and L5. Even in such a case, as illustrated in FIG. 16, the route identification images 728-2 and 728-3 are displayed in the upper display area A of the display area 700 in a manner to correspond to visually recognized position relationship between the corresponding lane routes L4 and L5 by the driver 300. In this way, the driver 300 can intuitively grasp which of the lane routes L4 and L5 each of the route identification images 728-2 and 728-3 corresponds.

In the present embodiment (including the variation examples), as the position information of the moving body, the position information such as the GPS position information obtained by position information obtaining means (for example, the vehicle navigation device 400) is used. However, the position information is not limited thereto. That is, the position information of the moving body may be any information that can specify the position of the moving body relative to the position of the movable route. For example, as the position information, the captured image captured by the image capturing means (for example, the stereo camera unit 110) that captures the front in the advancing direction of the moving body. In such a case, the captured image is analyzed to specify the relative position of the moving body to the position of the movable route displayed in the captured image.

The description that has been made so far is merely an example and specific effects are achieved for each of the following modes.

A first mode is a moving route guidance device that displays a route guidance image for guiding a driver 300 of a moving body (for example, a host vehicle 301) to a moving route (for example, a first left turnable route L1 or a central lane route L4) in a predetermined display area at front in a moving body advancing direction by image projection means. The moving route guidance device includes display control means (for example, an image controller 250) executing display control to change at least one of a content and a display position of the route guidance image based on position information of the moving body. The route guidance image includes: a plurality of route identification images 724-1, 724-2, 726-1, 726-2, 728-1, 728-2, and 728-3 respectively corresponding to a plurality of movable routes that is close to each other (the left turnable routes L1 and L2, and the lane routes L3, L4, and L5) and displayed in a manner to correspond to a visually recognized position relationship among the plurality of the movable routes by the driver or a predetermined reference position; and route instructing images 725, 727, and 729 displayed in association with the route identification images 724-1, 726-1, and 728-2 that correspond to a moving route guided by the route guidance image of the plurality of the movable routes. According to the present mode, at least one of the content and the display position of the route guidance image is changed based on the position information of the moving body. Thus, even when the visually recognized position or a magnitude of visual recognition of the actual movable route that is visually recognized by the driver is changed in conjunction with movement of the moving body, the content or the display position of the route guidance image is changed in accordance with such a change. Thus, while the visually recognized position, the magnitude of the visual recognition, or the like of the actual moving route, which is visually recognized, is changed every moment, the driver of the moving body, which currently moves, can keep recognizing a relationship between the displayed route guidance image and the actual moving route guided by the route guidance image. Here, the driver recognizes a position difference between actual points of the plurality of the movable routes by a difference in the visually recognized positions of the movable routes. At the time, in particular, in the case where the actual points of the plurality of the movable routes, which are closed to each other, differ in the moving body advancing direction (a depth direction visually recognized by the driver), unlike a case where the actual points differ in a lateral direction or a vertical direction, the difference in the visually recognized positions is small. Thus, it is difficult for the driver to recognize the position difference between the actual points of the plurality of the movable routes. For such a reason, in the typical device that displays the route guidance image of the moving route in a manner to correspond to the actual point of the moving route, it is difficult for the driver to recognize which of the plurality of the movable routes, which are close to each other, is the moving route guided by the route guidance image. In the present mode, the plurality of route identification images respectively corresponding to a plurality of route identification images corresponding to the plurality of the movable routes, which are close to each other, are displayed in het manner to correspond to the visually recognized position relationship between the plurality of the movable routes by the driver or the predetermined reference position (a position that does not correspond to the actual point of the movable route). Then, the route instructing image is displayed in association of the route identification image, which corresponds to the moving route guided by the route guidance image, of the route identification images. In this way, even in a situation where it is difficult to recognize the position difference between the actual points of the plurality of the movable routes, which are close to each other, the driver can accurately recognize which of the plurality of the movable routes is the moving route guided by the route guidance image.

In a second mode, in the first mode, the image capturing means (for example, the stereo camera unit 110) that captures the front in the moving body advancing direction is provided. The display control means executes the display control based on the position information and a captured image by the image capturing means. According to the above, it is possible to further accurately grasp the visual recognized position by the driver with respect to the plurality of the movable routes. Thus, it is possible to further appropriately display the plurality of the corresponding route identification images.

In a third mode, in the first mode or the second mode, the display control means displays the route identification image, which corresponds to the moving route guided by the route guidance image, of the route identification images in a manner to be more emphasized than the other route identification images. According to the above, the driver can further easily grasp which of the route identification images corresponds to the moving route to be guided.

In a fourth mode, in any one of the first mode to the third mode, the display control means displays the route identification image at a position, which overlaps lines of vision S1 and S2 of the driver with respect to the movable route, in the predetermined display area when the visually recognized position of the movable route, which corresponds to the route identification image, by the driver does not overlap the predetermined display area. According to the above, even in a situation where the visually recognized position of the movable route, which corresponds to the route identification image, by the driver does not overlap the predetermined display area, the driver easily grasps a corresponding relationship between the route identification image and the corresponding movable route.

In a fifth mode, in any one of the first to fourth modes, the display control means displays the route identification image such that visibility of the route identification image is lowered as a distance between each of the plurality of the movable routes and the moving body is reduced. As the distance between each of the plurality of the movable routes and the moving body is reduced, the difference in the visually recognized position between the plurality of the movable routes is clarified. Thus, necessity of the route identification image is decreased. When the visibility of the route identification image in the situation where the necessity is lowered as described above, it is possible to enhance the visibility of the front in the moving body advancing direction.

In a sixth mode, in any of the first to fifth modes, the route instructing image is another image (for example, a route instructing image 725) that separates from the plurality of the route identification images. According to the above, it is easy to independently change the display positions and the image contents of the plurality of the route identification images and the route instructing image. Thus, a degree of freedom of change can be increased.

In a seventh mode, in any of the first to fifth modes, the plurality of the route identification images is formed by branch images branched for each of the plurality of the movable routes, and the route instructing image is an arrow image that continues to the route identification image corresponding to the moving route guided by the route guidance image. According to the above, the driver can further accurately grasp the route instructing image and the route identification image, which is clearly associated with the corresponding route identification image and is associated with the route instructing image.

In an eighth mode, in any of the first to seventh modes, the image projection means (for example, a HUD body 230) is provided. According to the above, in the moving route guidance device that includes the image projection means, the driver can accurately recognize which of the plurality of the movable routes, which are close to each other, is the moving route guided by the route guidance image.

A ninth mode is a moving body (for example, a host vehicle 301), and includes the moving route guidance device according to the eighth mode. According to the above, it is possible to provide the moving body in which the driver can accurately recognize which of the plurality of the movable routes, which are close to each other, is the moving route guided by the route guidance image.

A tenth mode is a moving route guidance method that displays a route guidance image for guiding a driver of a moving body to a moving route in a predetermined display area at front in a moving body advancing direction by image projection means. The moving route guidance method includes: a position information obtaining process to obtain position information of the moving body; and a display control process to execute display control to change at least one of a content and a display position of the route guidance image based on position information obtained in the position information obtaining process. The route guidance image includes: a plurality of route identification images respectively corresponding to a plurality of movable routes that are close to each other and displayed in a manner to correspond to a visually recognized position relationship among the plurality of the movable routes by the driver or a predetermined reference position; and a route instructing image displayed in association with the route identification image that correspond to a moving route guided by the route guidance image of the plurality of the movable routes. According to the present mode, at least one of the content and the display position of the route guidance image is changed based on the position information of the moving body. Thus, even when the visually recognized position or a magnitude of visual recognition of the actual movable route that is visually recognized by the driver is changed in conjunction with movement of the moving body, the content or the display position of the route guidance image is changed in accordance with such a change. Thus, while the visually recognized position, the magnitude of the visual recognition, or the like of the actual moving route, which is visually recognized, is changed every moment, the driver of the moving body, which currently moves, can keep recognizing a relationship between the displayed route guidance image and the actual moving route guided by the route guidance image. Here, the driver recognizes a position difference between actual points of the plurality of the movable routes by a difference in the visually recognized positions of the movable routes. At the time, in particular, in the case where the actual points of the plurality of the movable routes, which are closed to each other, differ in the moving body advancing direction (a depth direction visually recognized by the driver), unlike a case where the actual points differ in a lateral direction or a vertical direction, the difference in the visually recognized positions is small. Thus, it is difficult for the driver to recognize the position difference between the actual points of the plurality of the movable routes. For such a reason, in the typical device that displays the route guidance image of the moving route in a manner to correspond to the actual point of the moving route, it is difficult for the driver to recognize which of the plurality of the movable routes, which are close to each other, is the moving route guided by the route guidance image. In the present mode, the plurality of route identification images respectively corresponding to a plurality of route identification images corresponding to the plurality of the movable routes, which are close to each other, are displayed in het manner to correspond to the visually recognized position relationship between the plurality of the movable routes by the driver or the predetermined reference position (a position that does not correspond to the actual point of the movable route). Then, the route instructing image is displayed in association of the route identification image, which corresponds to the moving route guided by the route guidance image, of the route identification images. In this way, even in a situation where it is difficult to recognize the position difference between the actual points of the plurality of the movable routes, which are close to each other, the driver can accurately recognize which of the plurality of the movable routes is the moving route guided by the route guidance image.

The above-described embodiments are illustrative and do not limit the scope of the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

The present invention can be implemented in any convenient form, for example using dedicated hardware, or a mixture of dedicated hardware and software. The present invention may be implemented as computer software implemented by one or more networked processing apparatuses. The processing apparatuses can include any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

This patent application is based on and claims priority pursuant to 35 U.S.C. § 119(a) to Japanese Patent Application No. 2018-00782, filed on Mar. 29, 2018, in the Japan Patent Office, the entire disclosure of which is hereby incorporated by reference herein.

REFERENCE SIGNS LIST

100 Object recognition device
110 Stereo camera unit
120 Information processing unit
200 Automotive HUD apparatus
220 Light source unit
230 HUD body
250 Image controller
300 Driver
300a Viewpoint 301 Host vehicle
302 Front windshield
400 Vehicle navigation device
500 Sensor
700 Display area
724-1, 724-2, 726-1, 726-2, 728-1, 728-2, 728-3 Route identification image
725, 727, 729 Route instructing image
A Upper display area
B Lower display area
G Virtual image
L1, L2 Left turnable route
L3, L4, L5 Lane route
S1, S2 Line of vision

The invention claimed is:

1. A moving route guidance device that displays a route guidance image for guiding a driver in a moving body to a moving route in a predetermined display area at front in a moving body advancing direction by an image projection optical system, the moving route guidance device comprising:
display control circuitry configured to execute display control to
change at least one of a content and a display position of the route guidance image based on position information of the moving body, wherein
the route guidance image includes:
a plurality of route identification images respectively corresponding to a plurality of movable routes that are close to each other and displayed in a manner to correspond to a visually recognized positional relationship among the plurality of movable routes by the driver or a predetermined reference position; and
route instructing images displayed in association with the route identification images that correspond to a moving route guided by the route guidance image of the plurality of movable routes,
the display control circuitry is further configured to execute the display control to display a route identification image, of the plurality of route identification images, at a position which overlaps lines of vision of the driver with respect to a movable route of the plurality of movable routes, and
the position is in the predetermined display area when a visually recognized position of the movable route by the driver does not overlap the predetermined display area.

2. The moving route guidance device according to claim 1, further comprising:
a sensor configured to capture a front view of the moving body in an advancing direction of the moving body, wherein
the display control circuitry is further configured to execute the display control based on the position information and an image captured by the sensor.

3. The moving route guidance device according to claim 1, wherein the display control circuitry is further configured to display the route identification image, which corresponds to the moving route guided by the route guidance image, of the route identification images in a manner to be more emphasized than the other route identification images.

4. The moving route guidance device according to claim 1, wherein the display control circuitry is further configured to display the route identification image such that visibility of the route identification image is lowered as a distance between each movable route of the plurality of movable routes and the moving body is reduced.

5. The moving route guidance device according to claim 1, wherein the route instructing image is another image that separates from the plurality of route identification images.

6. The moving route guidance device according to claim 1, wherein
the plurality of route identification images is formed by branch images branched for each of the plurality of movable routes, and
the route instructing image is an arrow image that continues to the route identification image corresponding to the moving route guided by the route guidance image.

7. The moving route guidance device according to claim 1, further comprising:
the image projection optical system.

8. A moving body comprising the moving route guidance device according to claim 7.

9. A moving route guidance method for displaying a route guidance image for guiding a driver of a moving body to a moving route in a predetermined display area at front in a moving body advancing direction by an image projection optical system, the moving route guidance method comprising:
obtaining position information of the moving body; and
executing display control to change at least one of a content and a display position of the route guidance image based on the obtained position information, wherein
the route guidance image includes:
a plurality of route identification images respectively corresponding to a plurality of movable routes that are close to each other and displayed in a manner to correspond to a visually recognized positional relationship among the plurality of movable routes by the driver or a predetermined reference position; and
route instructing images displayed in association with the route identification images that correspond to a moving route guided by the route guidance image of the plurality of movable routes,
the executing the display control further includes displaying a route identification image, of the plurality of route identification images, at a position which overlaps lines of vision of the driver with respect to a movable route of the plurality of movable routes, and
the position is in the predetermined display area when a visually recognized position of the movable route by the driver does not overlap the predetermined display area.

* * * * *